United States Patent [19]

Gossett et al.

[11] Patent Number: 5,155,304
[45] Date of Patent: Oct. 13, 1992

[54] AERIAL SERVICE WIRE

[75] Inventors: Keith A. Gossett, Glendale, Ariz.;
Francis J. Mullin, Chamblee, Ga.;
Wendell G. Nutt, Dunwoody, Calif.;
Todd A. Rhoades, Tempe, Ariz.

[73] Assignee: AT&T Bell Laboratories, Murray Hill, N.J.

[21] Appl. No.: 557,871

[22] Filed: Jul. 25, 1990

[51] Int. Cl.$^5$ .............................................. H01B 7/08
[52] U.S. Cl. ........................... 174/117 R; 174/23 C; 174/70 A; 174/117 F; 174/131 A; 385/113
[58] Field of Search ............... 174/41, 70 A, 117 F, 174/117 R, 131 A, 23 C; 385/113; 428/379, 383

[56] References Cited

U.S. PATENT DOCUMENTS

| | | | |
|---|---|---|---|
| 2,628,998 | 2/1953 | Frisbie | 174/112 |
| 2,950,338 | 8/1960 | Taylor | 170/40 R |
| 3,328,514 | 6/1967 | Cogelia | 174/113 R |
| 3,549,788 | 12/1970 | Apen et al. | 174/107 |
| 3,935,369 | 1/1976 | George et al. | 428/379 |
| 3,983,313 | 9/1976 | Ney et al. | 174/121 SR |
| 4,081,602 | 3/1978 | Paniri et al. | 174/103 |
| 4,089,585 | 5/1978 | Slaughter et al. | 385/113 |
| 4,148,560 | 4/1979 | Margolis | 385/113 |
| 4,199,225 | 4/1980 | Slaughter et al. | 385/113 |
| 4,220,812 | 9/1980 | Ney et al. | 174/117 F |
| 4,419,538 | 12/1983 | Hansell, III | 174/117 F |
| 4,479,984 | 10/1984 | Levy et al. | 427/54.1 |
| 4,638,117 | 1/1987 | Ney | 174/117 F |
| 4,723,831 | 2/1988 | Johnson et al. | 385/111 |
| 4,761,053 | 8/1988 | Cogelia et al. | 174/41 X |
| 4,815,813 | 3/1989 | Arroyo et al. | 174/23 C |
| 4,909,592 | 3/1990 | Arroyo et al. | 174/23 C |

FOREIGN PATENT DOCUMENTS

| | | |
|---|---|---|
| 0328409 | 2/1989 | European Pat. Off. |
| 2824521 | 1/1979 | Fed. Rep. of Germany |
| 3232108 | 3/1984 | Fed. Rep. of Germany |
| 9100536 | 1/1991 | Fed. Rep. of Germany |
| 1562676 | 3/1980 | United Kingdom |

OTHER PUBLICATIONS

Okonite sales bulletin ABW-5 Feb. 1985.

Primary Examiner—Morris H. Nimmo
Attorney, Agent, or Firm—E. W. Somers

[57] ABSTRACT

An aerial service wire (20) includes a jacket (40) having a generally rectangularly shaped cross section and comprising a polyvinyl chloride plastic material. Enclosed by the jacket are two groups of strength members (36—36) each of which includes a plurality of filaments and each of which is impregnated with a material which is compatible with that of the jacket. The strength members are disposed along axes (52,54) of the cross section which are normal to an axis (42) which passes through a geometric center through which a longitudinal axis (50) of the jacket passes. Conductors (30—30) which are individually insulated are disposed adjacent to the longitudinal axis with each strength member being disposed between the conductors and the outer surface of the jacket.

11 Claims, 3 Drawing Sheets

AERIAL SERVICE WIRE

TECHNICAL FIELD

This invention relates to aerial service wire. More particularly, it relates to an aerial service transmission medium which includes insulated metallic conductors or optical fibers and non-metallic strength members.

BACKGROUND OF THE INVENTION

Aerial service wire which has been referred to as drop wire extends the communications loop from distribution cable terminals to customers' premises. Typically, telephone plant aerial service wire comprises two parallel spaced metallic conductors. The metallic conductors not only provide transmission paths, but also they provide strength for aerial installations.

In one prior art aerial service wire, for example, it was customary to include two electroformed copper-clad steel conductors enclosed with an extruded rubber insulation covered by a textile serving, and jacketed with a rubber-like material. Although such protective coverings were in widespread use for many years and had proven satisfactory from most standpoints, there developed a long felt desire for an alternative, less expensive covering. Any alternative covering had to have the capability of withstanding exposure to the elements, as well as adequate low temperature flexibility, impact resistance, and abrasion resistance.

A substantially improved plastic covered aerial service wire is disclosed in U.S. Pat. No. 3,935,369 issued on Jan. 27, 1976 to E. J. George, et al. and includes two copper-clad steel conductors enclosed in insulation comprising a plasticized polyvinyl chloride (PVC) composition. The insulation serves also as a jacket. In addition to being more economical, this last described aerial service wire is lighter, more abrasion-resistant and easier to handle and terminate than its predecessor.

In a typical installation, each end portion of the aerial service wire is inserted into a metallic clamp. One of the clamps is attached to a customer's premises and the other one to a pole prior to electrical connections being made to wiring inside the customer's premises and to aerial distribution cable, respectively. At both the customer and the pole end of the aerial service wire, the wire is retained in engagement with the clamp by reactive forces exerted by the clamp on the insulation. These reactive forces come into play as a result of ice and wind loading, for example. If these forces are not transferred from the insulation to the conductors by coupling therebetween, the conductors will slip relative to the insulation within the clamp causing the insulation to rupture and the wire to sag excessively and, in some instances, to fall. Adhesion of the plastic material to the metallic conductors may provide suitable coupling.

On the other hand, if the adhesion between the insulation and the conductors is too great, stripping the covering from the conductors may be difficult. Excessive scraping causes some of the copper from the surface portion of the copper-clad steel conductor to be removed thereby increasing the electrical resistance of the conductor termination. Excessive scraping also reduces the cross-sectional area of the conductor or nicks it, thereby reducing its strength properties to the detriment of its load-supporting capability. Also, scraping may expose the steel, promoting corrosion of the bimetallic conductor.

Although aerial service wires as described in the George, et al. patent are adequate, a new, less expensive design had been sought. Environmental requirements for the disposal of residual copper and processing chemicals have raised the cost of manufacturing copper-clad conductors. Also, these conductors, on occasion, displayed another problem. The problem is the result of the smooth surface of the drawn metallic conductor which does not adhere to the PVC jacket as well as the rough surface of the earlier manufactured electroformed conductor. This problem was solved by applying electrostatically an adhesive to preheated conductors prior to the extrusion of the jacket material, but this solution involves an additional step.

The last described aerial service wire presented some other problems. It is relatively stiff and somewhat difficult to handle. Also, the wire cannot be terminated in insulation displacement type connectors because of the relatively thick PVC insulation which toughens as temperatures decrease and because copper-steel conductors are not easily and reliably accommodated by these kinds of connectors. Further cost reductions of the design are difficult to achieve inasmuch as the PVC material serves as both the jacket and conductor insulation, thereby requiring a balancing of mechanical and electrical requirements.

A most important reason for seeking a new design was the corrosion of the bimetallic conductor which occurs in coastal and industrial areas. Corrosion appears where a conductor has been stripped for termination, where a conductor has been accidentally nicked during separation of the conductors by pliers, or where maintenance tests have been made improperly by inserting test pins through insulation to a conductor.

In a somewhat recently introduced aerial service wire which overcomes these problems, conductors are disposed generally in the geometric center of the cross section transverse to a longitudinal axis of the cable. A jacket which comprises a plastic material encloses the conductors with the conductors being adjacent to each other and to the longitudinal axis of the jacket. The longitudinal axis passes through a geometric center of each transverse cross section of the jacket. This aerial service wire also includes two non-metallic support strands or strength members each of which includes a plurality of filaments that are assembled together and each of which is impregnated with a plastic material which is compatible with that of the jacket. Each of the strength members is disposed between the conductors and an outer surface of the jacket such that the strength members and the longitudinal axis which is interposed therebetween are aligned. Each strength member passes through each cross section of the jacket along an axis which spans the cross section and which extends through the geometric center thereof.

Advantageously, the just-described aerial service transmission medium provides coupling of roving or yarn type strength members to the jacket which avoids prior art schemes of using an intermediate adhesive material or preheating of the conductors which also serve as strength members. Also, because of the geometry, support clamps at a customer's premises and at a pole bear on outer portions of the jacket cross section over the strength members instead of over the conductors. However, it has been found that the coupling of the jacket material to the strength members as determined by a static load test is not as great as had been sought.

What is needed and what still is not provided by the prior art is an aerial service transmission medium which at least meets the strength properties of the most recent prior art aerial service wire. The strength members of the sought-after aerial service transmission medium must have enhanced coupling to the jacket over that of the most recent prior art design and must be compatible with present support schemes at a customer's premises. Still further, the design should be one which easily may be adaptable to optical fiber loop transmission.

SUMMARY OF THE INVENTION

The foregoing problems have been overcome by the communications transmission media of this invention. An aerial service wire includes at least one communications transmission medium which is covered with a plastic material. A jacket which comprises a plastic material encloses the medium with the medium being adjacent to a longitudinal axis of the jacket. The longitudinal axis passes through a geometric center of each transverse cross section of the jacket. A cross section of the jacket transverse to the longitudinal axis is defined by a width and a height with an axis which spans each jacket cross section. The height of end portions of the cross section is greater than the height of a center portion which connects the end portions. The aerial service wire also includes two groups of non-metallic support strands or strength members.

Each group is disposed between said at least one transmission medium and an outer surface of the jacket and aligned with one of the end portions. Also, each strength member of each group includes a plurality of filaments that are assembled together and is impregnated with a plastic material which is compatible with that of the jacket that causes the strength member to be coupled to the jacket. Also each group includes sufficient strength members and separation among the strength members of the group to provide suitable coupling between the jacket and the strength member system.

For a one pair metallic conductor service wire, two insulated copper conductors are disposed between strength members. For a quad wire, the conductors are disposed in a circle about the center of each jacket cross section.

It should be readily apparent that an aerial service transmission medium of this invention may include optical fiber conductors as well as metallic conductors. For an optical fiber aerial service cable, at least one optical fiber is enclosed in a core wrap and disposed about the geometric center of the jacket with a center of the fibers being disposed along the axis which spans each jacket cross section.

Advantageously, an aerial service transmission medium of this invention provides enhanced coupling of roving or yarn type strength members to the jacket. Also, because of the geometry, support clamps at a customer's premises and at a pole bear on outer portions of the jacket cross section over the groups of strength members.

BRIEF DESCRIPTION OF THE DRAWING

Other features of the present invention will be more readily understood from the following detailed description of specific embodiments thereof when read in conjunction with the accompanying drawings, in which.

DETAILED DESCRIPTION

Figure 1:
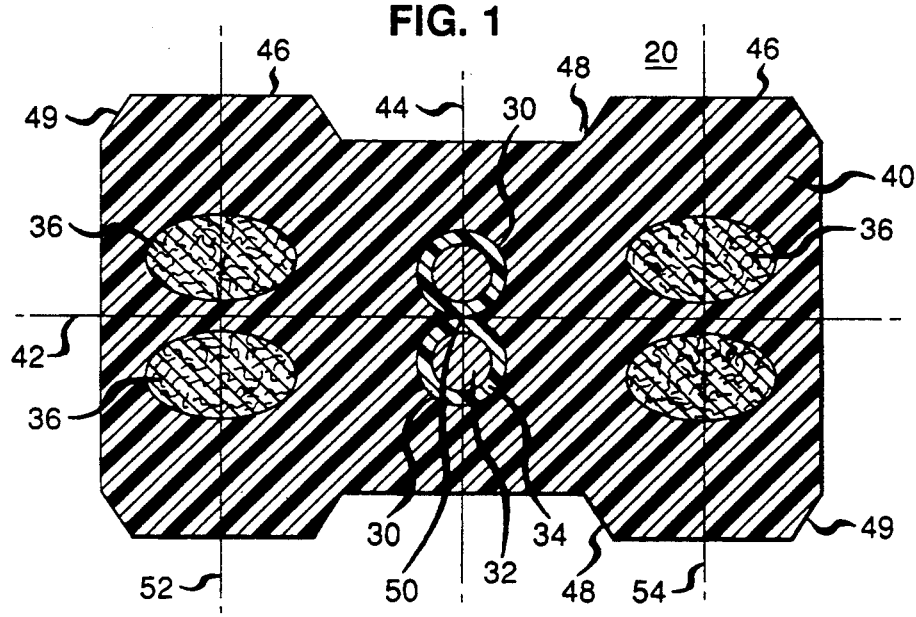
FIG. 1 is an end cross sectional view of an aerial service wire of this invention.

Referring now to FIG. 1, there is shown a communications transmission medium of this invention and, more particularly, an aerial service wire 20. The aerial service wire 20 is used to bring service from overhead aerial distribution cables which are strung between poles to customer premises. One end of the aerial service transmission wire is supported from a wedge-shaped clamp attached to a pole and connected to a distribution cable. See U.S. Pat. No. 4,761,053 which issued on Aug. 2, 1988 in the names of N. J. Cogelia, et al. and which is incorporated by reference hereinto. The other end is supported from a similar clamp attached to a customer's home. An electrical connection is made to conductors which extend inside the premises to telephone handsets or other communications equipment.

In the particular embodiment shown in FIG. 1, the aerial service wire 20 is often termed a drop wire. Referring again to FIG. 1, it is seen that the aerial service wire 20 includes two insulated conductors 30—30, which in a preferred embodiment are not twisted together. Each of the insulated conductors 30—30 in FIG. 1 includes a metallic conductor 32, which is made of a material such as copper, for example, and is provided with individual insulation in the form of a cover 34. In the preferred embodiment of FIG. 1, the insulation is a polyolefin material such as polyethylene.

The aerial service wire 20 also includes a strength member system which includes two groups of strength members 36—36 which extend longitudinally. Each group in the embodiment shown in FIG. 1 includes two of the strength members 36—36. Each of the strength members in the preferred embodiment comprises a fibrous strand material which may comprise a plurality of filaments that are stranded together and which is impregnated with a plastic material. The filaments may be a material such as a fiberglass or an organic material such as aramid fiber. Further, the filaments may be assembled together so that they extend generally parallel to the longitudinal axis of the strength member in which case they comprise a roving or twisted together to form a yarn. In a preferred embodiment, the members 36—36 which provide strength for the aerial service wire 20 each are comprised of a plurality of E-glass fibers. E-glass fibers comprise a borosilicate composition with the fibers having a minimum tensile strength of 200,000 psi. In a preferred embodiment, each strength member comprises about 8000 fibers.

As can be seen in FIG. 1, the insulated conductors 30—30 and the strength members 36—36 are enclosed in a jacket 40 comprising a plastic material which in a preferred embodiment is polyvinyl chloride (PVC). The jacket 40 is generally rectangular in cross section and includes a first or neutral axis 42 which extends horizontally in FIG. 1 and a second axis 44 which is normal thereto. The jacket cross section has a width as measured in a direction parallel to the first axis 42 and a height as measured in a direction parallel to the second axis 44. Further, the jacket 40 is provided with enlarged end portions 46—46 at opposite ends of the axis 42. The enlarged portions 46—46 create troughs 48—48 which extend longitudinally of the wire. Also, the corners of the jacket are provided with chamfers 49—49.

The arrangement of the insulated conductors 30—30 and of the strength members 36—36 within the jacket 40 is important. As is seen in FIG. 1, the conductors 30—30 are generally disposed adjacent to a longitudinal axis 50 of the jacket which passes through a geometric center of each jacket cross section through which the first axis 42 also passes. The orientation of the conductors 30—30 may vary with respect to the axis 44 along the length of the aerial service wire 20. For example, the conductors 30—30 may be disposed along the second axis 44 which is substantially normal to the axis 42 as shown or may be disposed along an axis which is inclined instead of normal to the axis 42, or may be disposed along the axis 42.

Generally, in a one pair aerial service wire, the insulated conductors may be spaced apart slightly. This may be done for two reasons. First, the spacing is required in order to achieve a predetermined mutual capacitance for the conductor pair. Secondly, it is done in order to avoid bonding between the two insulated conductors, particularly during the application of a molten plastic material to form the jacket 40.

Also of importance is the disposition of the strength members 36—36 with respect to the conductors 30—30 and the jacket 40. As shown, they are disposed along axes 52 and 54 which are outboard of the conductors 30—30 and which are normal to the axis 42. The axes 52 and 54 are parallel to the axis 44. Each strength member 36 is disposed along the axis 52 or 54 between the conductors 30—30 and the outer surface of the jacket. Also, the strength members of each group are aligned and in the preferred embodiment, corresponding strength members of the two groups are aligned.

Further, each strength member 36 is disposed within one of the enlarged end portions 46—46, which are referred to as support columns. As a result, the compressive forces provided by a clamp are aligned with the support columns 46—46 and the strength members 36—36 therein. Conductors are protected against compressive loading of the support clamp by the troughs 48—48.

The aerial service wire 20 forms generally a catenary between the two wedge-shaped clamps. The load due to the weight of the length of the aerial service wire in the catenary causes forces to be exerted between the clamps and the ends of the aerial service wire. Each clamp engages the outer surface of the jacket 40. It should be apparent that if there is insufficient adhesion between the jacket 40 and the strength members 36—36, the reaction of the clamp on the aerial service wire due to combined effects of wire weight and any ice and wind loading could cause the jacketing material to be pulled therefrom leaving the insulated conductors unprotected and perhaps causing the wire to fall. It follows that there must be suitable coupling between the jacketing composition and the strength members 36—36. At the same time, the adhesion between the jacketing composition and the insulated conductors 30—30 should be a minimum and preferably zero to allow slippage between the conductors and the jacket 40 when flexed during installation and use.

Not only must the strength members 36—36 be suitably adhered to the jacket 40, they must also have suitable strength characteristics to prevent static load failure. Static load failure is caused by filament abrasion, flaws and tensile load imbalance. Filaments are abraded by neighboring filaments in the support member and by particles in the jacket 40. This is most severe under the clamps. Flaws occur with a probability that increases with the filament length and cause static load failures in a length of time which is approximately inversely proportional to the wire length. Uneven sharing of the tensile load results when the filaments are not coupled to share tensile loads evenly. As some filaments break, others accepted the load until the total cross section of the strength member fails.

Generally, as a solution to these problems, impregnated rovings or yarns are used as strength members. The material which is used to impregnate the strength members must be such that the strength members are coupled to the jacket sufficiently so that there is no rupture, nor slippage nor any degradation of dielectric strength after a 290 pound tensile load has been applied to the aerial service transmission medium through support clamps for a twenty-four hour period at room temperature. The material used to impregnate the strength members must be a material that will couple to the jacket 40. Also, it must exhibit a relatively high coefficient of static friction with the material of the jacket 40. Further it must have hydrolytic stability. The impregnating material may be formed either by condensation or addition polymerization reactions and may include, for example, urethanes, acrylic acid or acrylate-based material, epoxies, polyesters, and polyvinyl chloride or other vinyl based materials. For strength member materials such as fiberglass, a coupling agent or sizing such as silane must be used to couple the impregnating material to the filaments; for materials such as KEVLAR ® fiber, a coupling agent may not be required.

Vinyl compatible, impregnated fiberglass rovings or yarns are used as strength members. The impregnating material coats each filament with a layer which protects against abrasion, and couples each filament to its neighbor to bridge flaws and establish tensile load balance.

Fiberglass impregnation is customarily accomplished by fiberglass suppliers. Glass filaments are drawn from a furnace bushing and cooled by a water spray followed by the application of a water dispersion of silane. Drying removes excess water and alcohol, which is formed as the silane bonds to glass, and leaves a silane-coated filament with organo functional groups positioned to couple with a vinyl compatible impregnating material. Each strength member is impregnated in a bath with the sized fibers being spaced apart to enhance the impregnation. For an example of a method of impregnating a bundle of filaments, see U.S. Pat. No. 4,479,984 which issued on Oct. 30, 1984 in the names of N. Levy and P. D. Patel and which is incorporated by reference hereinto.

Impregnated roving or yarn overcomes a disadvantage of plain roving or yarn for the strength members 36—36. Unlike plain roving or yarn, any flaws in any of the filaments are bridged by the impregnating material which also prevents abrasion. There is sufficient adhesion of the jacket 40 to the strength members 36—36 to allow suitable transfer of forces to the strength members from the clamps 26—26. Impregnation increases the flex life of the completed structure over that of the copper-clad steel conductor design by a factor of about two. Further, the flex life of an aerial service wire which includes impregnated strength members is, at expected maximum surface temperatures, about ten times that of one which includes strength members that are not impregnated.

Under the intense loading of a drop wire clamp, impregnated roving may fail by the outer layers of roving breaking and shearing from the inner layers. The aerial service wire of this invention provides more outer layers of roving by using at least two strength members on each side of the wire cross section. It is within the scope of this invention to provide a plurality of strength members 58—58 along each side of the wire (see FIG. 2) with each strength member including relatively few strands. This brings many more outer layers into play and decreases substantially any probability of failure. The strength members may be arranged in a random or in an ordered manner. However, there must be sufficient separation between adjacent strength members of each group to allow suitable coupling to develop with the plastic material of the jacket.

The aerial service wire 20 provides other advantages. It has a flame-retardant jacket. Conductors are positioned for protection against impact and abrasion. Another advantage relates to handling criteria. The unprotected hands of a craftsperson preparing the wire for termination are not exposed to the filaments as the jacket is removed to access the conductors.

The use of individually insulated conductors 30—30 avoids problems with a prior art aerial service wire wherein a single plastic material was used to provide insulation for copper-clad steel conductors and a jacket. The plastic material had to be tough, have adequate low temperature flexibility, acceptable resistance to compression, ultra-violet resistance, acceptable weatherability, adequate flame-retardance because of the installation adjacent to customer's premises and high insulation resistance to insulate the conductors. Inasmuch as each function, insulating and jacketing, was required to provide particular properties, compromises were made to accommodate both functions with a single material. In the aerial service wire 20, the polyolefin material is an insulation for the conductors and the polyvinyl chloride an excellent jacketing material. Furthermore, the polyolefin does not bond to the polyvinyl chloride and thereby allows slippage between the conductors and the jacket. In addition, the polyolefin insulation has a lower dielectric constant than polyvinyl chloride, allowing an acceptable mutual capacitance with a closer spacing of conductors and reduced overall cross section, which reduces wind and ice loading, to be achieved.

Figure 2:
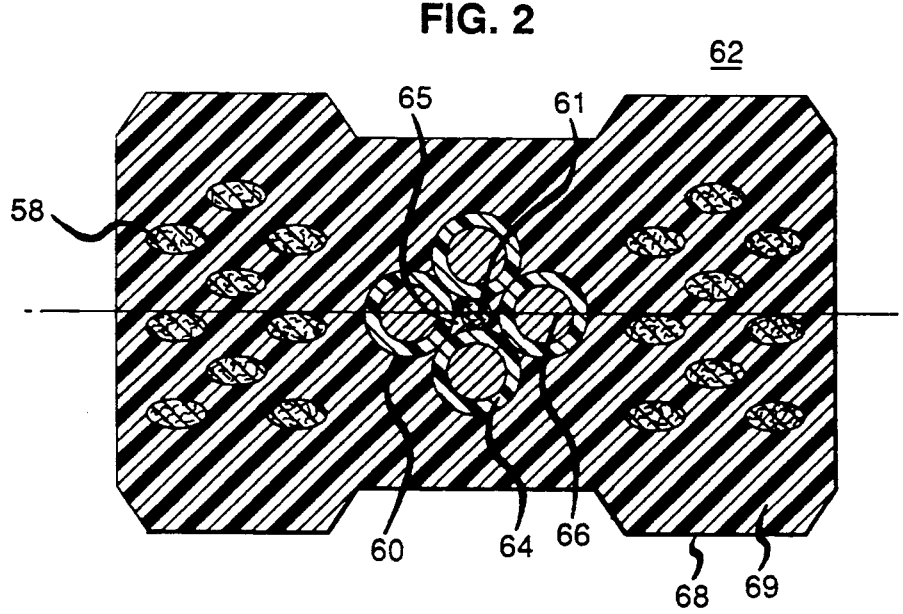
FIGS. 2 and 3 are end cross sectional views showing alternate embodiments of aerial service wire.

It should be readily apparent that the configuration of the aerial service wire 20 may be used to accommodate a quad 60, for example, of insulated conductors (see FIG. 2) instead of a pair. As can be seen in FIG. 2, the configuration of a quad wire 62 is substantially the same as that for the single pair wire. The quad wire comprises two conductor circuits of individually insulated conductors 64—64, the conductors of each two conductor circuit being diagonally opposite to each other. Included in the core may be a longitudinally extending waterblocking member 61 which may comprise a yarn impregnated with a superabsorbent material. The conductors of the pair are disposed about a center 65 which is disposed along a centerline axis 66 of the cross section of the aerial service wire. Strength members 67—67 are disposed along the axis 66 within support columns 68—68 of a jacket 69.

Figure 3:
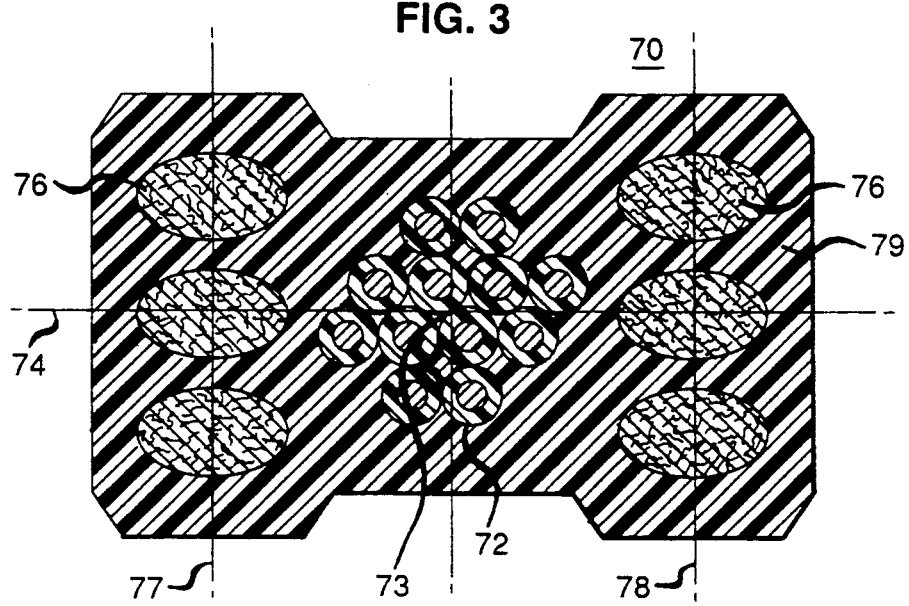

In another embodiment which is shown in FIG. 3, an aerial service wire 70 includes a core comprising a plurality of pairs of insulated conductors 72—72 which are disposed adjacent to a longitudinal centerline axis 73. The axis 73 passes through an axis 74. The aerial service wire 70 includes two groups of strength members 76—76 with each group including three strength members. The strength members 76—76 of one group are disposed along an axis 77 which is normal to the axis 74 and those of the second group, along an axis 78, which also is normal to the axis 74. The aerial service wire 70 exhibits increased coupling of the strength member system to a jacket 79 comprised of a plastic material.

Figure 4:
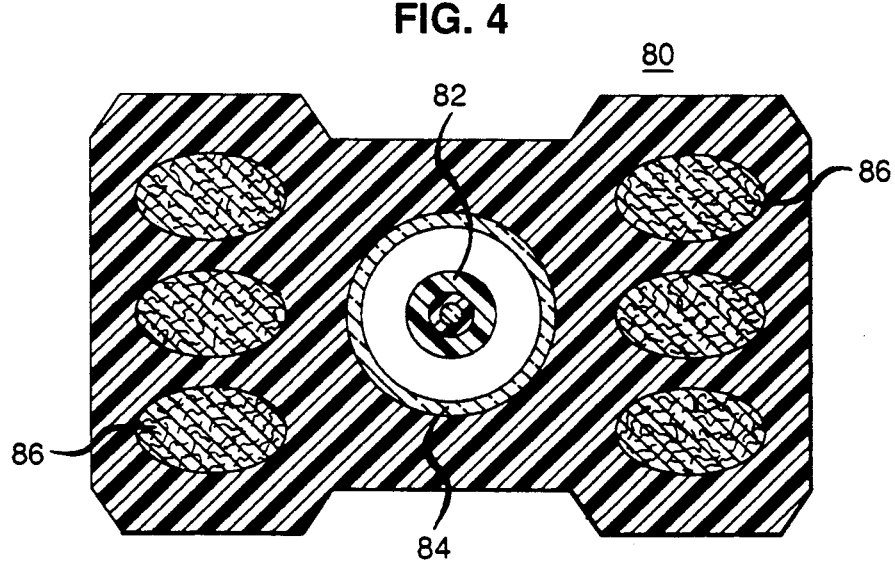
FIGS. 4 and 5 are end cross sectional views of optical aerial service wires.
Figure 5:
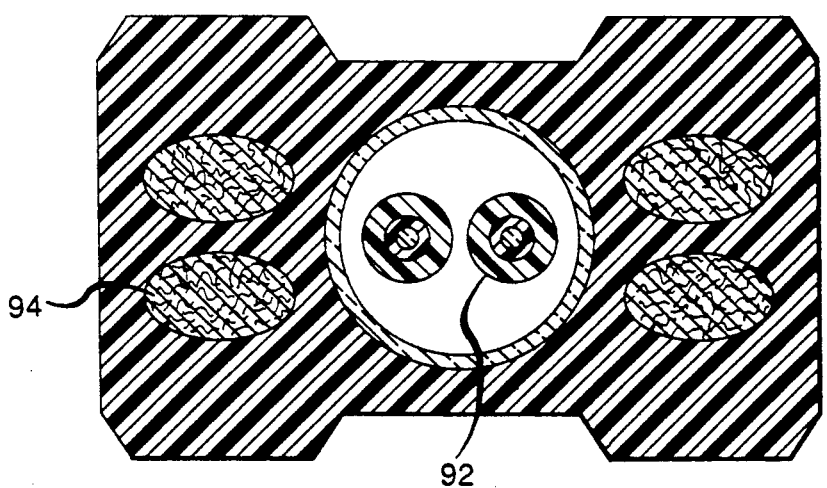

Aerial service wire of this invention also may include optical fiber. In FIG. 4, an aerial service wire 80 includes one optical fiber 82 disposed within a core tube 84. As is seen in FIG. 4, the aerial service wire 80 includes two groups of strength members 86—86 with each group including three of the strength members. An aerial service wire 90 depicted in FIG. 5 includes two optical fibers 92—92 and a strength member system which includes two groups of strength members 94—94 with two being in each group.

It is to be understood that the above-described arrangements are simply illustrative of the invention. Other arrangements may be devised by those skilled in the art which will embody the principles of the invention and fall within the spirit and scope thereof.

We claim:

1. An aerial service wire, which comprises:
   a core comprising at least one transmission medium which is enclosed with a plastic material;
   a jacket which comprises a plastic material and which encloses said transmission medium, said at least one transmission medium being adjacent to a longitudinal axis of symmetry of said jacket and wherein a cross section of said jacket transverse to the longitudinal axis of symmetry is defined by a width and a height with an axis which spans the jacket cross section, the height of end portions of the cross section being greater than the height of a center portion which connects the end portions to provide a longitudinally extending trough in said jacket which upon the application of cutting forces thereto facilitates the accessing of its transmission medium; and
   a strength member system comprising two groups of non-metallic strength members with each group being disposed between said tranmission medium and an outer surface of the jacket and aligned with one of the end portions and with each strength member of each group comprising a plurality of filaments that are gathered together and impregnated with a plastic material that causes it to be coupled to said jacket, each group including sufficient strength members and separation thereamong to provide sufficient surface area in engagement with the plastic material of said jacket to obtain suitable coupling between said jacket and said strength member system.

2. The aerial service wire of claim 1, wherein each strength member of each group is disposed along an axis which is normal to said axis which spans said jacket cross section.

3. The aerial service wire of claim 1, wherein said wire further includes a longitudinally extending waterblocking member which is associated with said core.

4. The aerial service wire of claim 3, wherein said waterblocking member comprises a yarn-like material which has been impregnated with a superabsorbent material.

5. The aerial service wire of claim 1, wherein the axis which spans said jacket cross section is a first transverse axis of symmetry and wherein said aerial service wire comprises a plurality of insulated metallic conductors which are disposed in a group adjacent to the longitudinal axis of symmetry of said wire.

6. The aerial service wire of claim 1, wherein three strength members are disposed adjacent to each lateral side of the transverse cross section with one of each set of three being disposed along the first transverse axis of symmetry of the transverse cross section which is normal to a second axis of symmetry which intersects said longitudinal axis of symmetry and wherein each one of the other two of each set of three strength members is spaced from said first transverse axis of symmetry and is disposed along a third transverse axis which is parallel to said second axis of symmetry.

7. The aerial service wire of claim 1, wherein said jacket is comprised of a flame retardant plastic material.

8. The aerial service wire of claim 7, wherein said jacket comprises a polyvinyl chloride plastic material.

9. The aerial service wire of claim 1, wherein each strength member comprises a roving which has been impregnated with a resinous material, each said strength member having suitable adhesion to said plastic material of said jacket.

10. The aerial service wire of claim 1, wherein the plastic material of said jacket does not bond to the plastic material which encloses said at least one transmission medium.

11. The aerial service wire of claim 10, wherein the transmission medium becomes separated from the jacket because of the non-affinity of plastic material which encloses the at least one transmission medium and the plastic material comprising the jacket.

* * * * *